United States Patent

[11] 3,578,747

[72] Inventor Richard F. Schramm
St. Louis, Mo.
[21] Appl. No. 695,408
[22] Filed Jan. 3, 1968
[45] Patented May 18, 1971
[73] Assignee Speed Equipment Incorporated
St. Louis, Mo.

[54] SHRINK TUNNEL WITH TURNTABLE
6 Claims, 10 Drawing Figs.

[52] U.S. Cl. ................................................ 34/184,
53/184, 126/338, 263/7
[51] Int. Cl. ............................................ F26b 11/00
[50] Field of Search.............................................. 34/184,
236, 242; 13/21; 53/184; 99/391, 443; 107/60;
126/41 (A); 198/209; 219/388; 263/7; 126/338

[56] References Cited
UNITED STATES PATENTS
1,534,072 4/1925 Mursch ........................ 126/338
1,752,433 4/1930 Hortvet ........................ 263/7
1,957,811 5/1934 Stalle........................... 107/60
2,920,177 1/1960 Brane........................... 121/41AX
3,164,939 1/1965 Burke........................... 53/379
3,256,420 6/1966 Werman...................... 263/7X Primary Examiner—Frederick L. Matteson
Assistant Examiner—Harry B. Ramey
Attorney—Rogers, Ezell, Eilers & Robbins ABSTRACT: A portable shrink tunnel with turntable means for heat shrinking plastic film about various objects to be wrapped. The shrink tunnel is provided with a turntable disc having a loading station in which the objects are wrapped and placed on the turntable, a heat-shrinking station within an overlying shrink tunnel that may be expandable to cover one-quarter to one-half of the turntable, and a discharge station on the turntable which is adjacent the receiving station. The turntable is constantly rotated and carries the objects to be wrapped 360° from the receiving station, through the shrink tunnel, and the discharge station. The shrink tunnel is composed of two arcuate housing sections telescopically adjustable to vary the tunnel length, and provide a means for controlling the tunnel heat supplied in the tunnel and also to vary the area of the loading or receiving station. A heating element may be positioned underneath the turntable disc at the receiving station to heat the disc which aids in maintaining the wrapping film about the article to be wrapped before it is charged to the heat shrink tunnel.

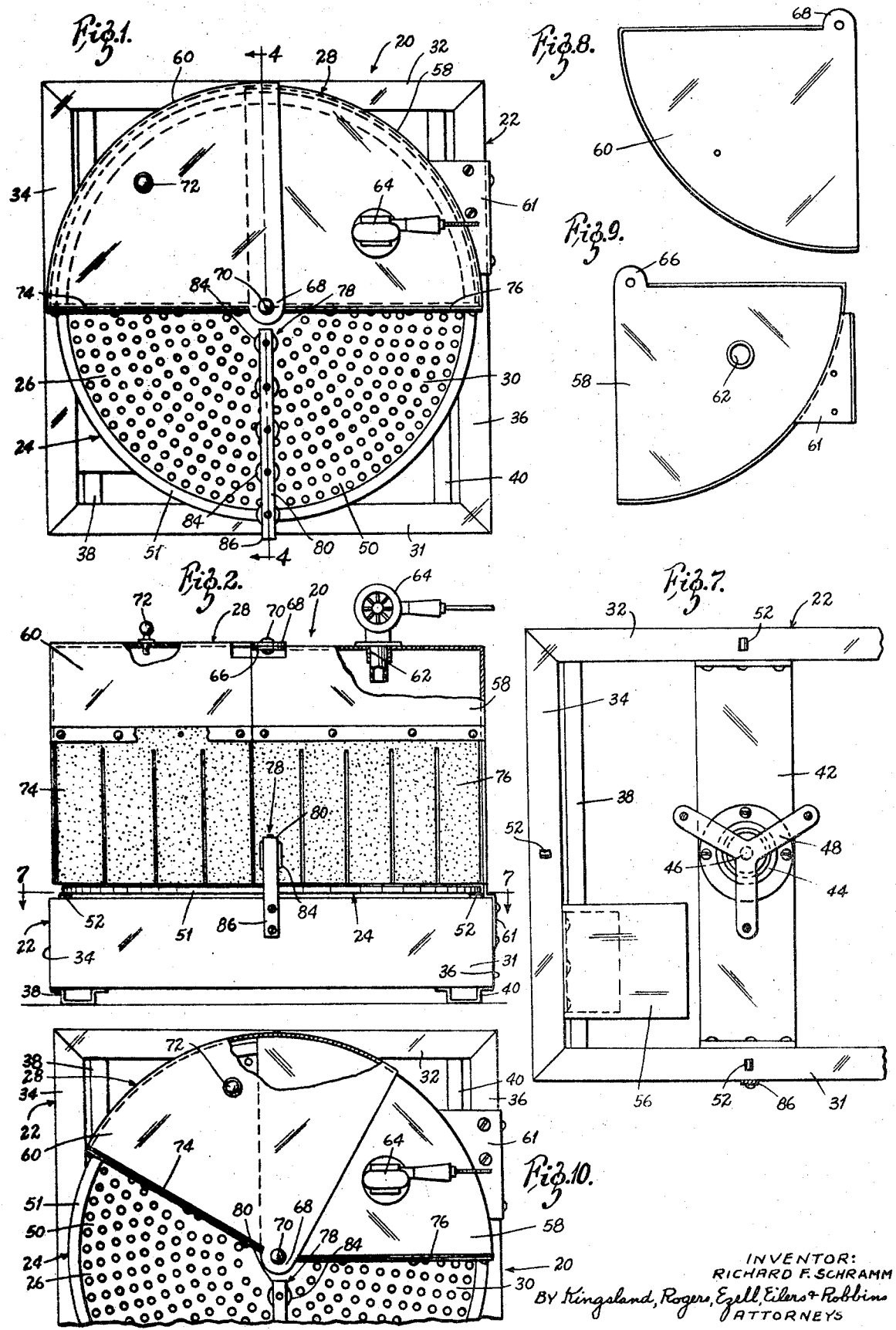

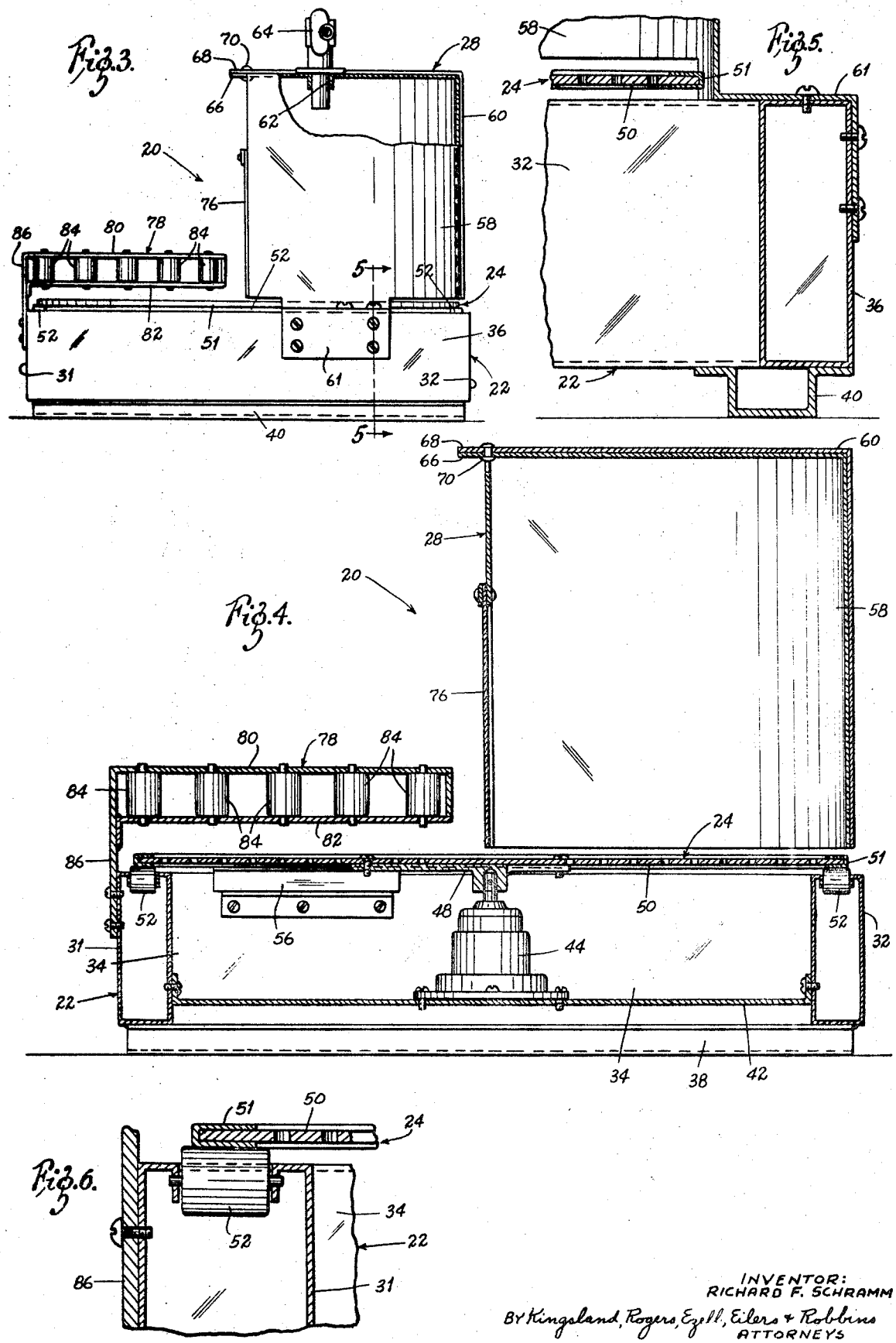

SHRINK TUNNEL WITH TURNTABLE

SUMMARY OF THE INVENTION

This invention relates to improvements in portable apparatus for heat shrinking film about objects as disclosed in Burke U.S. Pat. No. 3,164,939. Such apparatus, commonly termed shrink tunnels, employ a continuously moving belt to receive articles to be wrapped at a receiving station and transport them through a housing employed as a shrink tunnel to an end portion overlying the continuously moving belt at a discharge station to discharge the plastic film wrapped objects. Heat platen means have been employed under a heat-conductive belt in such apparatus to provide means for heating a belt and lightly "tack" or "shrink" the overlapping ends of the film as it is wrapped about the objects at the receiving station to loosely hold the objects together before they are charged to the shrinking tunnel.

The instant invention provides improvements in the aforementioned shrink tunnel apparatus by providing a turntable in the form of a heat-conductive platelike disc element, which rotates through a receiving station, a shrinking station, and a discharge station. The turntable, by its very nature, does not flex as in a continuously moving belt and thereby avoids any breakdown of the belt due to a continuous flexing and obviates problems in dislodging or tracking of the belt. In addition, through this invention, the shrink tunnel housing overlying the turntable can be telescopically adjusted in order to vary the length of travel and, of course, time of travel within the tunnel area. This obviates any necessity to vary the speed of the turntable or to vary the temperature within the turntable, both of which could be effected of course by electrical control means. By the adjustment of the telescopic shrink tunnel housing, the total heat provided and length of travel can be varied, coupled with increases or decrease in the area of the receiving station portion of the turntable. The turntable is further provided with a self-guiding gate separating the discharge station from the receiving station, such that when articles that are wrapped are discharged from the outlet of the tunnel to the discharge area they are guided off the turntable so as not to interfere with the receiving station.

The shrink tunnel provided with the turntable of this invention can be simply employed by relatively unskilled operators in institutions such as hospitals, and the like, schools, restaurants, grocery stores, and wherever objects are to be wrapped with heat-shrinkable plastic film. An extensive measure of control is provided for various types of objects or different types of heat-shrinkable film requiring different amounts of heat through the means for varying the total time through the shrink tunnel. The versatility of the shrink tunnel makes it adaptable for various form of usage, The apparatus is rugged and yet simple to operate and maintain.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of illustration only and that the invention is not limited thereto.

In the drawings:

FIG. 1 is a top plan view of the heat shrink oven with the turntable of this invention;

FIG. 2 is a view in front elevation of the oven;

FIG. 3 is a view in side elevation of the oven taken from the right side of FIG. 1;

FIG. 4 is an enlarged view in section of the oven taken on the line 4—4 of FIG. 1;

FIG. 5 is an enlarged view in section taken on the line 5—5 of FIG. 3 showing the mounting construction of the oven on the base;

FIG. 6 is an enlarged fragmentary view taken at the left side of FIG. 4 showing the bearing relationship of the turntable with roller bearings mounted on the base;

FIG. 7 is a fragmentary top plan view showing the mounting of the turntable and the location of the heat platen, the view being taken as indicated by the line 7—7 of FIG. 2;

FIG. 8 is a bottom plan view of the adjustable left portion of the heat oven housing;

FIG. 9 is a bottom plan view of the stationary right-hand portion of the heat oven housing; and FIG. 10 is a fragmentary top plan view similar to FIG. 1 but showing the heat oven partially telescoped to reduce the time of dwell within it.

DESCRIPTION OF THE INVENTION

Referring now to the drawings, the portable shrink tunnel apparatus of this invention is generally identified by the reference numeral 20 in FIGS. 1 through 4. It is comprised of a framelike base 22, a turntable 24 having a receiving station 26, a telescopic shrink tunnel 28, and a discharge station 30.

The framelike base 22 is best shown in FIGS. 1, 4, 5, 6 and 7. As there shown, it is comprised of a frame having hollow front and rear members 31 and 32 and side members 34 and 36. A pair of longitudinally extending side base supports 38 and 40 extend from the front to the rear of the frame and support it, as shown in FIGS. 1, 4 and 5. A central brace 42 likewise extends from the front to the rear of the frame and is bolted on the front and rear members as shown in FIGS. 4 and 7.

The turntable 24 is comprised of a motor 44 mounted upon the brace 42 and having a shaft 46 which is fixed to a hub plate 48. The hub plate is connected to a perforated metal turntable plate 50. The turntable plate 50 is provided with a peripheral sleeve 51, which is in registry with roller bearings 52 to provide a wearing surface and reinforcement at the peripheral edges of the turntable plate. This turntable plate overlies the central portions of the left, rear, and side members of the frame and is supported in load-bearing relation on the roller bearings, which are mounted in the hollow frame members as best shown in FIGS. 4 and 6. A heating element in the form of a heat platen 56 is mounted under the receiving station 26 and is attached to the side frame member 34, as best shown in FIGS. 1, 4 and 7.

The shrink tunnel 28, as best shown in FIGS. 1, 2 and 8—10, is comprised of a stationary arcuate housing 58 which is mounted upon a housing and a movable arcuate housing 60 which is in telescopic relation with the stationary housing. These housings are shown in 90° arcuate cross section, but it will be understood that they may be either more or less as desired. The stationary housing 58 is provided with a mounting plate 61, which is fixed to the side of the housing and is mounted upon the side frame member 36, as shown in FIGS. 1 and 3. The housing 58 is further provided with an opening 62 which receives a portable hot air blower 64 which may be inserted therein for heating purposes, or removed for manual heat shrinking outside the shrink tunnel as desired. The shrink tunnel housing section 58 is further provided with a dog-eared extension 66, which underlies a corresponding dog-eared section 68 on the housing section 60, which, with a pivot pin or shaft 70, provides for pivotal telescopic relative movement between the two sections, as will appear in FIG. 10. The arcuate housing 60 is additionally provided with a handle 72 to provide for manual movement of the housing from the extended position shown in FIG. 1 to the retracted position shown in FIG. 10.

The housing 60 is provided with a flexible split curtain 74 as shown in FIG. 2. This curtain defines an inlet into the shrink tunnel. The stationary arcuate housing 58 is likewise provided with a split flexible curtain 76, which defines an outlet for the shrink tunnel to the discharge station 30.

A baffle or guide means 78 is provided as shown in FIGS. 1 and 4 to define the line of demarcation between the receiving station 26 and the discharge station 30. The baffle 78 is comprised of a pair of longitudinally extending support elements 80 and 82, which receive roller bearings 84 as best shown in FIG. 4. An angled extension 86 provides for mounting to the front frame member 31. The roller bearings in the baffle 78 automatically guide the wrapped articles as they are discharged from the shrink tunnel to the discharge station 30 to direct the articles off the discharge station to the front of the shrink tunnel apparatus as viewed in FIG. 1.

OPERATION

The shrink tunnel of this invention is simply set up for use by merely starting the motor 44, which provides for rotation of the turntable plate 50. The hot air blower 64 is then energized to provide heat in the shrink tunnel 28 and the two communicating arcuate sections 58 and 60. Lastly, the heat platen 56 is energized to provide heat both through convection of air passing through the perforated holes in the turntable plate and through radiation by heating the plate itself. The apparatus is now ready for use.

The operator wraps the desired object to be wrapped with heat-shrinkable plastic film and then places the object with the overlying wrapped ends downward directly upon the slowly rotating turntable plate at the receiving station 26. The contact of the overlapped ends of the film with the heated turntable plate will cause partial shrinking or tacking of the overlapped edges, such that the wrapped film does not easily become dislodged and can be simply carried on the turntable through the inlet opening 74 into the shrink tunnel. The wrapped object is then carried through the shrink tunnel and for the period of time that it passes therein is subjected to heat to cause the shrinking of the film tightly about the object to be wrapped. The object is then carried through the split curtain discharge or outlet opening 76 onto the discharge station 30 where it is moved by rotation of the plate against the baffle 78. The compound movement provided by the articles upon the rotating plate in contact with the roller bearings 84 and the baffle will cause the article to be discharged to the front of the apparatus at a point adjacent the right side of the baffle viewed in FIG. 1.

The shrink tunnel is shown in the fully expanded position of the movable arcuate section 60 and the stationary housing section 58. Where it is desired to reduce the period of dwell in the shrink tunnel, a partial telescopic movement is effected by moving the arcuate section by grasping the handle 72 and simply moving it to the position shown in FIG. 10. This not only reduces the dwell but also provides a greater working surface over the receiving station 26 where this is desired. It will be apparent that other measures of control of the heat provided in the period of time that the wrapped article is subjected to the heat can be effected by varying the speed of the turntable motor and by varying the hot air temperature of the hot air blower 64. However, the simplest means is effected through this invention by simply contracting or expanding the telescopic housing as aforedescribed.

Various changes and modifications may be made within the invention as will be readily apparent to those skilled in the art. Such changes and modifications are within the scope and teaching of this invention as defined by the claims appended hereto.

I claim:

1. A shrink tunnel for use in heat-shrinking plastic-wrapping film about objects to be wrapped comprising a base, a turntable heat-transferable object-supporting disc, means for rotating said disc, a station above said disc for receiving articles to be wrapped, a heat-shrinking station above said disc adjacent said receiving station defined by a housing extending above said disc, means for heating said housing, a heat-retaining inlet connecting said receiving station with said housing and a heat-retaining outlet in said housing opening into a discharge station situated above said disc, said inlet and outlet having means for passing the wrapped objects carried by the disc while preventing any substantial loss of heat within said tunnel, said housing having means for adjusting the length of travel between said inlet and outlet by means for varying the arcuate length of the heat-shrinking station.

2. The shrink tunnel of claim 1 in which the means for adjusting the length of travel between said inlet and outlet comprises a pair of contiguous arcuate telescopic housing shell members.

3. The shrink tunnel of claim 2 in which said shell members are comprised of a stationary housing and a relatively movable housing pivoted for telescopic movement at the axis of said turntable disc.

4. The shrink tunnel of claim 3 in which each of said shell members is provided with a heat-retaining split curtain covering an opening in the shell member extending above the turntable disc defining an inlet and outlet to the heat shrink station housing.

5. A shrink tunnel for use in heat-shrinking plastic-wrapping film about objects to be wrapped comprising a base, a turntable heat transferable object-supporting disc, means for rotating said disc, a station above said disc for receiving articles to be wrapped, a heat-shrinking station above said disc adjacent said receiving station defined by a housing extending above said disc, means for heating said housing, a heat-retaining inlet connecting said receiving station with said housing and a heat-retaining outlet in said housing opening into a discharge station situated above said disc, said inlet and outlet having means for passing the wrapped objects carried by the disc while preventing any substantial loss of heat within said tunnel, said tunnel comprising a square rimlike frame defining an opening in the center, a base extending across the bottom of said frame, a motor mounted upon said base comprising said disc-rotating means and bearing means at the sides of the frame in load-bearing relation to the periphery of the turntable disc.

6. A shrink tunnel for use in heat-shrinking plastic-wrapping film about objects to be wrapped comprising a base, a turntable heat transferable object-supporting disc, means for rotating said disc, a station above said disc for receiving articles to be wrapped, a heat-shrinking station above said disc adjacent said receiving station defined by a housing extending above said disc, means for heating said housing, a heat-retaining inlet connecting said receiving station with said housing and a heat-retaining outlet in said housing opening into a discharge station situated above said disc, said inlet and outlet having means for passing the wrapped objects carried by the disc while preventing any substantial loss of heat within said tunnel, a vertically extending baffle overlying said disc separating the receiving station from said discharge station, said baffle being positioned to direct the wrapped objects off the turntable, said baffle being comprised of radially extending member supporting roller bearing elements adapted to be contracted by the wrapped objects in the discharge station.